United States Patent [19]
Garcea

[11] 3,751,917
[45] Aug. 14, 1973

[54] EXHAUST CHAMBER FOR A MOTOR VEHICLE PROVIDED WITH AN INTERNAL COMBUSTION ENGINE

[75] Inventor: Giampaolo Garcea, Milan, Italy

[73] Assignee: Alfa Romeo S.p.A., Milan, Italy

[22] Filed: Oct. 13, 1971

[21] Appl. No.: 188,777

[30] Foreign Application Priority Data

Oct. 24, 1970  Italy..........................7343 A/70

[52] U.S. Cl.................................. 60/288, 23/288 F
[51] Int. Cl.............................................. F01n 3/14
[58] Field of Search........................... 60/288, 287; 23/288 F

[56] References Cited
UNITED STATES PATENTS

| | | | |
|---|---|---|---|
| 2,991,160 | 7/1961 | Claussen | 60/288 |
| 3,090,677 | 5/1963 | Scheitlin | 60/288 |
| 3,094,394 | 6/1963 | Innes | 60/288 |
| 3,201,207 | 8/1965 | Lentz | 60/288 |
| 3,260,566 | 7/1966 | Fisher | 60/288 |
| 3,380,810 | 4/1968 | Hamblin | 23/288 F |

*Primary Examiner*—Douglas Hart
*Attorney*—Holman & Stern

[57] ABSTRACT

An exhaust chamber for internal combustion engines of motor vehicles, in which the exhaust gases, before being discharged to the atmosphere, are passed through one of two coaxial chambers, with the inner chamber being filled with a suitable catalyst for the combustion of unburnt substances, depending on the load condition of the engine, so that the catalyst is contacted by these exhaust gases only at low working power.

5 Claims, 2 Drawing Figures

Patented Aug. 14, 1973
3,751,917
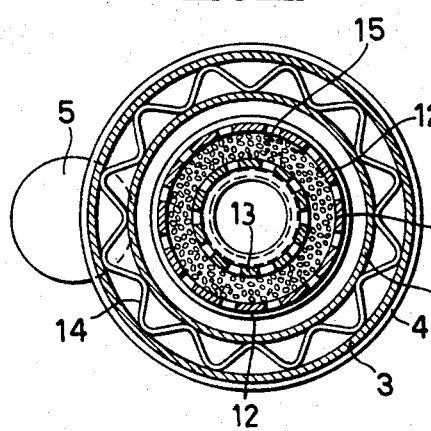
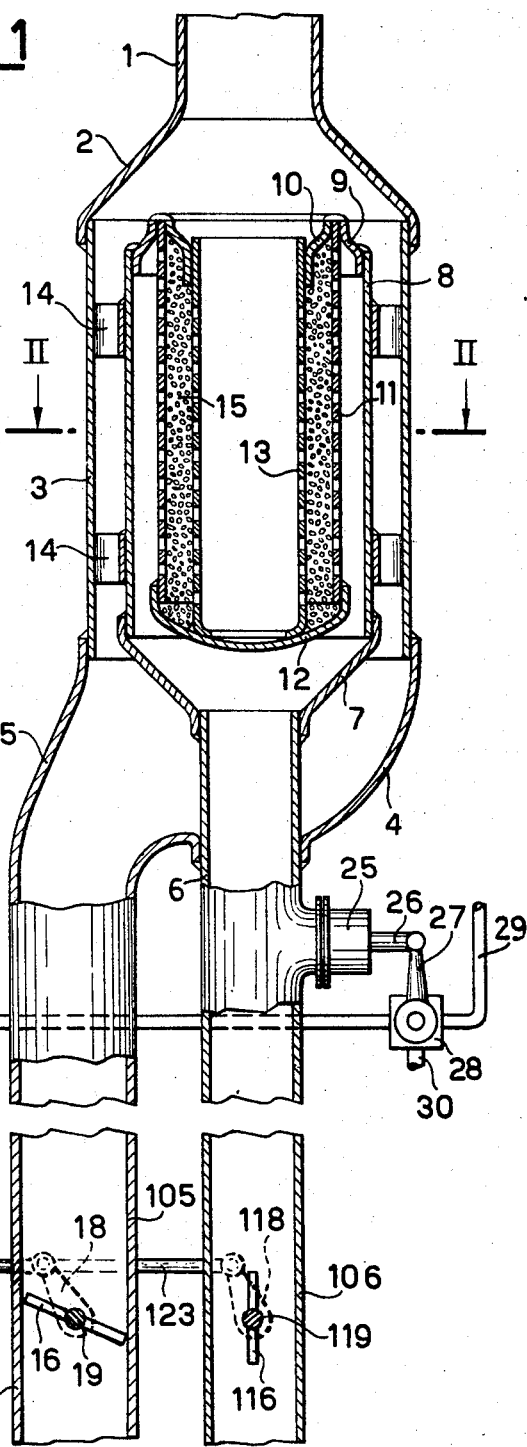

EXHAUST CHAMBER FOR A MOTOR VEHICLE PROVIDED WITH AN INTERNAL COMBUSTION ENGINE

BACKGROUND OF THE INVENTION

The problems related to atmospheric pollution worsen daily, and among these problems are those relating to atmospheric pollution by the exhaust gases of the engines of motor vehicles.

PRIOR TECHNIQUE

A very effective method for the solution of these latter problems consists in placing a catalytic chamber in the exhaust duct of the engine, so that the exhaust gases pass through said chamber before flowing to atmosphere.

The gases arrive at the chamber containing unburnt substances of various type, but also containing a quantity of oxygen sufficient to permit the combustion of said unburnt substances. If the quantity of oxygen is not already present in the gases leaving the cylinder, it is injected into the gases before the inlet to the exhaust chamber. In the catalytic chamber it is the presence of the catalyst which favors the combination of unburnt substances with the oxygen.

The problem of pollution exists when the vehicle travels in inhabited centers, but it does not exist an open roads or highways. As the working power reaches a maximum only on open roads or highways while when travelling through inhabited centers it is fairly small, the diminution or elimination of unburnt substances may be limited to a quite small range of engine powers. Because of this, the solution to the problem is greatly facilitated as the catalytic chamber may be constructed in such a manner as to operate at high efficiency when small gas volumes (corresponding to said low powers) flow therethrough, whereas at high powers the gases may flow to atompshere without flowing through the chamber and consequently without excessively heating and hence compromising the catalytic chamber, and especially the catalyst.

Catalysts which are very efficient at low temperatures are not able to resist temperatures which are much higher. The tendency is thus for the catalytic chamber to be placed in the exhaust duct assembly in such a manner that the exhaust gases at high power do not flow therethrough, or at least not all of the exhaust gases corresponding to high powers.

The catalyst becomes effective when the catalyst and the gases flowing therethrough are at a temperature which exceeds a certain value. Thus, if at a certain moment, hot gases begin to flow through a cold exhaust chamber, the efficiency of the chamber is very low for a certain period of time (until it heats up).

Difficulties also derive from the fact that the very high termperatures reached by the exhaust chamber during its operation, dictate the need for external insulation in order to avoid excessive transmission of heat to the structures of the other components of the vehicle.

Considerable design and constructional difficulties result from said high temperatures and in particular from the differences between the temperatures reached by the various parts of the exhuast chamber. Temperature differences give rise to different degrees of thermal expansion. If this thermal expansion is not able to take place freely, high stresses may be set up which cause permanent deformation and breakage of the exhaust chamber.

OBJECTS AND SUMMARY OF THE INVENTION

The object of the present invention is to provide an exhaust chamber for a motor vehicle with an internal combustion engine which simultaneously resolves the various aforementioned difficulties.

It is characterized in that it comprises a substantially cylindrical or truncated conical enclosure provided internally with concentric and coaxial dividing walls of lesser diameters defining, for example, two annular interspaces for the flow of the entering gas, with the more external space for the free passage of the gas being provided with a first outlet pipe and the other more internal space, surrounded by the first space and for the passage of gas through the catalyst, being provided with another outlet pipe, and in the first outlet pipe, there being inserted a check valve controlled automatically by a device sensitive to the suction pressure or any device sensitive to those engine operating conditions which increase the unburnt substances in the exhaust gases.

In this manner, the actual catalytic part of the exhaust chamber is insulated from the atmosphere by the flow of those exhaust gases which bypass said catalytic part, and the overall dimensions are also kept small. In the case of an engine exhaust duct of circular cross section having a diameter of 40 mm., if the catalytic device is of cylindrical shape with a diameter of about 100 mm., the gases which short circuit the catalytic device may flow through an annular section disposed concentric with the catalytic device, with the cross section of said annular duct needing only a radial thickness of 4 mm. in order for the annular cross section to be the equivalent to the cross section of said pipe of 40 mm. diameter from which the gases arrive. In this manner, by a small increase in diameter, insulation is obtained and the passage is made for the gases which short circuit the catalytic device. A further advantage also arises, namely that during high working powers, the catalytic device is maintained at a fairly high temperature so that it is ready for operation at the moment in which the engine passes from high working power to low working power.

Further advantages of the design according to the present invention are made more evident by reference to the accompanying drawing which shows a preferred embodiment of the exhaust chamber according to the present invention, by way of example, in which:

BRIEF DESCRIPTION OF THE DRAWINGS

FIG. 1 is a longitudinal section through the exhaust chamber, and

FIG. 2 is a view taken on the line II—II of FIG. 1, the view looking in the direction of the arrows.

DETAILED DESCRIPTION OF THE INVENTION

In FIG. 1 the exhaust chamber, whose external shape is essentially that of a cylinder, is shown as a sectional view through the axis of the cylinder. This figure shows a final section 1 of the exhaust duct from the exhaust manifold fixed to the engine head.

The reference numeral 2 indicates the head on the inlet side of an external cylinder or container 3, which is provided at its end with a bottom 4 from which an outlet duct 5 branches laterally.

A through pipe 6 is welded to the edges of a central hole in the bottom 4. To said pipe internal to the container 3 is fixed bottom 7 of a container 8 which is also cylindrical as in the case of the container 3, and is situated internal to the container 3 and coaxial therewith. At the other end, i.e. at the end of entry of the gases into the container 3, the container 8 has a perforated head comprising two annular members 9 and 10.

A cylindrical surface of perforated sheet 11 is disposed in the container 8 and coaxial therewith. One of the two circular end edges of said cylindrical sheet is rigid with the annular members 9 and 10 at the joining line therebetween. The other circular end edge of the cylindrical sheet 11 is rigid with bottom 12. One of the circular end edges of a second perforated sheet surface 13 having a diameter less than that of the perforated sheet 11, and consequently internal thereto, is rigid with the bottom 12. The circular edge of the other end of the perforated sheet 13 adheres to the internal edge of the perforated head defined by number 9 and 10 without being rigid therewith, so that axial relative movements due to different degrees of expansion of the sheets 11 and 13 are permitted.

The container 8, rigid by way of the bottom 7 and pipe 6 with the bottom 4 of the container 3, is maintained central to the container 3 by means of members 14, comprising, for example, a fluted metal hoop, each of said members being rigid with one of the two containers while it can move axially with respect to the other container. In this manner, any thermal expansion differences between the container 8 and the container 3 are permitted without giving rise to internal stresses in the assembly.

The catalyst, generally consisting of granules, is contained and retained in a space 15 between the two perforated sheets 11 and 13 and the two corresponding ends at the two extremities.

The duct 5 branching from the exhaust chamber is extended into a tubular duct or pipe 105 which contains a butterfly valve 16 keyed on a shaft 19 which is freely pivoted to the wall of said duct 105. A lever 18 is keyed on the shaft 19 external to the pipe 105, and is controlled by a rod 23 rigid with a membrane or diaphragm 20 which closes a chamber 21 and on which a compression spring 24 acts. A duct 22 opens into the chamber 21 and is connected either to a duct 30 or to a duct 29 by a valve 28. This valve is controlled by two arms 26 and 27 from a device diagrammatically indicated at 25 sensitive to the temperature of the gases flowing in the duct 6. Said device 25 causes the valve 28 to connect the duct 22 to the duct 30 which is connected to atmosphere, when the temperature of the gases in the pipe 6 exceeds a predetermined value. At lower temperatures, the device 25 causes the valve 28 to connect the duct 22 to the duct 29, which opens into the suction duct, not shown, of the motor.

A shaft 119, on which are keyed an arm 118 and a butterfly valve 116, similar to the valve 16, is freely pivoted to the wall of a tubular duct or pipe 106, which is an extension of the pipe 6. The arm 118 is connected to the arm 18 by a rod 123 in such a manner that when the valve 16 is closed, the valve 116 is open and vice versa.

The operation of the exhaust chamber illustrated is briefly as follows:

The gases from the engine, not shaown, enter the exhaust chamber from the duct 1. When the engine delivers a relatively low power and hence with high suction levels in the intake pipe, and when the temperatures of the catalyst mass and hence of the gases discharged from the duct 6 are not high, the membrane 20 is pulled against the spring 24 into the position shown in FIG. 1 by the suction in the chamber 21, thereby closing the valve 16 and opening the valve 116. In this manner, the exhaust gases flow through the catalyst mass and are then discharged through the ducts 6 and 106.

When the engine delivers high powers, and consequently when the suction levels in its intake duct are low, the membrane 20 is released under the action of the spring 24, thus closing the valve 116 and opening the valve 16. A similar effect is caused by a rise in gas temperature beyond a predetermined level in the duct 6. In that case, the device 25 causes the chamber 21 to connect to atmosphere by way of the ducts 22 and 30 as above explained. In this manner, the exhaust gases pass into the interspace between the walls 3 and 8, and are then discharged through the ducts 5 and 105.

The ducts 105 and 106 may proceed either independently or joined together into a single duct to conventional silencers, and then discharge freely to the atmosphere.

It is important to note that the catalyst mass contained in the space 15 is lapped at the wall 8 by the exhaust gases, even when these latter are fed to the duct 5 without flowing through the mass itself. The mass is hence maintained at a sufficient temperature for effectively catalyzing the gases as soon as they are fed therethrough.

The valve 116 which checks the flow through the duct 6 may for simplicity be eliminated. In this case, when the valve 16 is open, the exhaust gases are proportioned between the ducts 5 and 6 in an inverse ratio to the pressure loss over their respective paths. The gases to be fed to the duct 6 must flow through the catalyst mass, which offers a certain resistance to their passsage, and for this reason, only a relatively small fraction of the gases is discharged through the duct 6, whereas the larger part flows through the duct 5. This limited permanent passage through the catalyst mass can be advantageous when it has to be maintained at a relatively high temperature for its effectiveness. An exhaust chamber has been described herein in which the check valves for the duct 5 and 6 are controlled with regard to their operational position by the suction in the intake duct of the engine, but other quantities which are functions of the delivered power may be suitable for this control. For example, the valve 16 can be connected to the valve which throttles the air intake to the engine, so that the one closes the other.

What is claimed is:

1. An exhaust chamber for an internal combustion engine having an exhaust manifold and an exhaust duct leading from the exhaust manifold and through which chamber exhaust gases pass to at least minimize pollution of the atmosphere, including a first substantially cylindrical enclosure, a second substantially cylindrical enclosure mounted within and coaxial to the first enclosure providing an outer annular chamber between the first and second enclosures in communication with the exhaust duct, said second enclosure providing an inner chamber in communication with the exhaust duct and the outer annular chamber, a first discharge duct communicating with the inner chamber and with the atmosphere, a second discharge duct communicating with the outer annular chamber and with the atmosphere, inner and outer spaced apart perforated cylindrical members connected together at their ends, means mounting said perforated members coaxially within the inner chamber with the outer perforated member spaced from the second cylindrical member to provide an annular space therebetween, a catalyst mass for the combustion of unburnt products contained in the exhaust gases in the space between the inner and outer perforated members, a valve member in the second discharge duct, a device sensitive to the power delivered by the engine, and means connecting the valve to the device operable to close the valve and hence the second discharge duct when the power delivered is relatively low, whereby the exhaust gases enter the inner chamber, pass radially through the catalyst mass via the perforations in the inner member, into the annular space via the perforations in the outer member, and thence through the first duct to the atmosphere.

2. The exhaust chamber as claimed in claim 1, in which said device sensitive to the power is a device sensitive to the suction in the suction duct of said engine.

3. The exhaust chamber as claimed in claim 1, in which a device sensitive to the temperature in said inner chamber acts on said valve member in the sense of opening it when said temperature is greater than a predetermined value, independently of any control by said device sensitive to the power delivered by the engine.

4. The exhaust chamber as claimed in claim 1, in which a second valve member is provided in said first exhaust duct operably connected to said valve member of said second exhaust duct so that the second valve member is open when said valve member is closed and vice versa.

5. The exhaust chamber as claimed in claim 1, in which the mounting for the second cylindrical enclosure within the first cylindrical enclosure includes support means allowing their relative axial movement, said first exhaust duct being connected with said first enclosure where it passes through its walls.

* * * * *

UNITED STATES PATENT OFFICE
CERTIFICATE OF CORRECTION

Patent No. 3,751,917          Dated August 14, 1973

Inventor(s) Giampaolo Garcia

It is certified that error appears in the above-identified patent and that said Letters Patent are hereby corrected as shown below:

Column 5, line 6, read "member", second occurrence as -- enclosure --.

Signed and sealed this 16th day of April 1974.

(SEAL)
Attest:

EDWARD M. FLETCHER, JR.          C. MARSHALL DANN
Attesting Officer                Commissioner of Patents